(12) United States Patent
Dai

(10) Patent No.: US 7,409,696 B2
(45) Date of Patent: Aug. 5, 2008

(54) OPENING ACTUATOR FOR VIDEO DISC PLAYER

(75) Inventor: Xi-Ping Dai, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 706 days.

(21) Appl. No.: 11/019,856

(22) Filed: Dec. 21, 2004

(65) Prior Publication Data
US 2005/0268314 A1    Dec. 1, 2005

(30) Foreign Application Priority Data
May 28, 2004    (CN)    .................. 2004 2 0046529 U

(51) Int. Cl.
*G11B 33/02*    (2006.01)
(52) U.S. Cl. .................................................. 720/657
(58) Field of Classification Search ......... 720/654–657, 720/685; 369/75.11, 77.11; 360/99.02, 99.06
See application file for complete search history.

(56) References Cited

U.S. PATENT DOCUMENTS

| | | | |
|---|---|---|---|
| 5,943,308 A | 8/1999 | Foo | 369/75.1 |
| 6,407,971 B1* | 6/2002 | Kojima | 720/657 |
| 6,717,902 B2* | 4/2004 | Huang | 720/657 |
| 7,284,252 B2* | 10/2007 | Hui-Chu et al. | 720/657 |
| 2004/0062171 A1* | 4/2004 | Huang | 369/75.1 |
| 2004/0062172 A1 | 4/2004 | Huang | 369/75.1 |
| 2005/0229195 A1* | 10/2005 | Liu | 720/655 |
| 2006/0026613 A1* | 2/2006 | Mao et al. | 720/655 |
| 2006/0277558 A1* | 12/2006 | Wang et al. | 720/657 |

FOREIGN PATENT DOCUMENTS

CN    99246348.2    8/2000

\* cited by examiner

*Primary Examiner*—Allen T Cao
(74) *Attorney, Agent, or Firm*—Morris Manning Martin LLP; Tim Tingkang Xia, Esq.

(57) ABSTRACT

An opening actuator for a video disc player includes a clasp arm with a clasp hole at a distal end thereof, a press button, an elastic component for repositioning the press button and a cover. The press button includes a stop portion for limiting a stroke of the press button, a clasp portion, and at least one guide portion. The cover includes a positioning member and at least one guide member receiving the at least one guide portion. The clasp portion of the press button engages in the clasp hole of the clasp arm for holding the top lid on the cover, and the press button can actuate the clasp portion thereof to exit the clasp hole for releasing the top lid from the cover. Because the press button is located in a side of the cover of the video disc player, there is little risk of the press button being accidentally actuated.

22 Claims, 7 Drawing Sheets

OPENING ACTUATOR FOR VIDEO DISC PLAYER

BACKGROUND OF THE INVENTION

1. Field of the Invention

The present invention relates to opening actuators for video disc players such as DVD (Digital Video Disc) players and CD (Compact Disc) players.

2. Description of the Prior Art

Video disc players have become more popular than ever before. Video disc players are much smaller and more convenient than desktop media players.

In FIG. 7, a cross-sectional view of part of a conventional optical disc player is shown. An opening actuator is located at a corner of a top lid 301. The opening actuator comprises a press button 401 and a holding hook 50. The holding hook 50 comprises a pivot portion 511, an L-shaped hook portion 521, and an S-shaped elastic portion 531. One end of the S-shaped elastic portion 531 is connected to a back of the L-shaped hook portion 521, and the other end of the S-shaped elastic portion 531 is connected to a stop wall 251 of an upper cover 201 of the optical disc player. The pivot portion 511 is formed at one end of the L-shaped hook portion 521, while a hook (not labeled) is formed at the other end of the L-shaped hook portion 521. The hook engages in a hole 321 defined in a side wall of the top lid 301. When a downward pressing force is applied to the press button 401, the S-shaped elastic portion 531 deforms. The hook portion 521 rotates about the pivot portion 511, and the hook exits the hole 321 so that the top lid 301 is released. The kind of mechanism can be found in Chinese Patent No. ZL 99246438.2.

However, the press button 401 is liable to be accidentally actuated, for example if an object is dropped on it or if a user mistakenly presses it instead of the correct functional button. When this happens, the top lid 401 is suddenly opened. If the optical disc player is running at the same moment, the rotating optical disc is liable to fly off and cause damage or injury. Furthermore, the S-shaped elastic portion 531 of the opening actuator is prone to become fatigued and lose its elasticity.

SUMMARY OF THE INVENTION

Accordingly, an object of the present invention is to provide a simple and reliable opening actuator for a video disc player.

In order to achieve the object set out above, an opening actuator for a video disc player of the present invention comprises: a clasp arm with a clasp hole at a distal end thereof, the clasp arm being adapted to be attached to a lid of the video disc player; a press button including a stop portion for limiting a stroke of the press button, a clasp portion, and at least one guide portion; an elastic component disposed around the press button for repositioning the press button by applying restoring force; and a cover comprising a positioning means for positioning the press button, and at least one guide means receiving the at least one guide portion of the press button. The clasp portion of the press button engages in the clasp hole of the clasp arm for holding the top lid on the cover, and the press button can actuate the clasp portion thereof to exit the clasp hole for releasing the top lid from the cover. Because the press button is located in a side of the cover of the video disc player, there is little risk of the press button being accidentally actuated.

BRIEF DESCRIPTION OF THE DRAWINGS

Other objects, advantages and novel features of the present invention will become more apparent from the following detailed description when taken in conjunction with the accompanying drawings, in which.

DETAILED DESCRIPTION OF THE INVENTION

Figure 1:
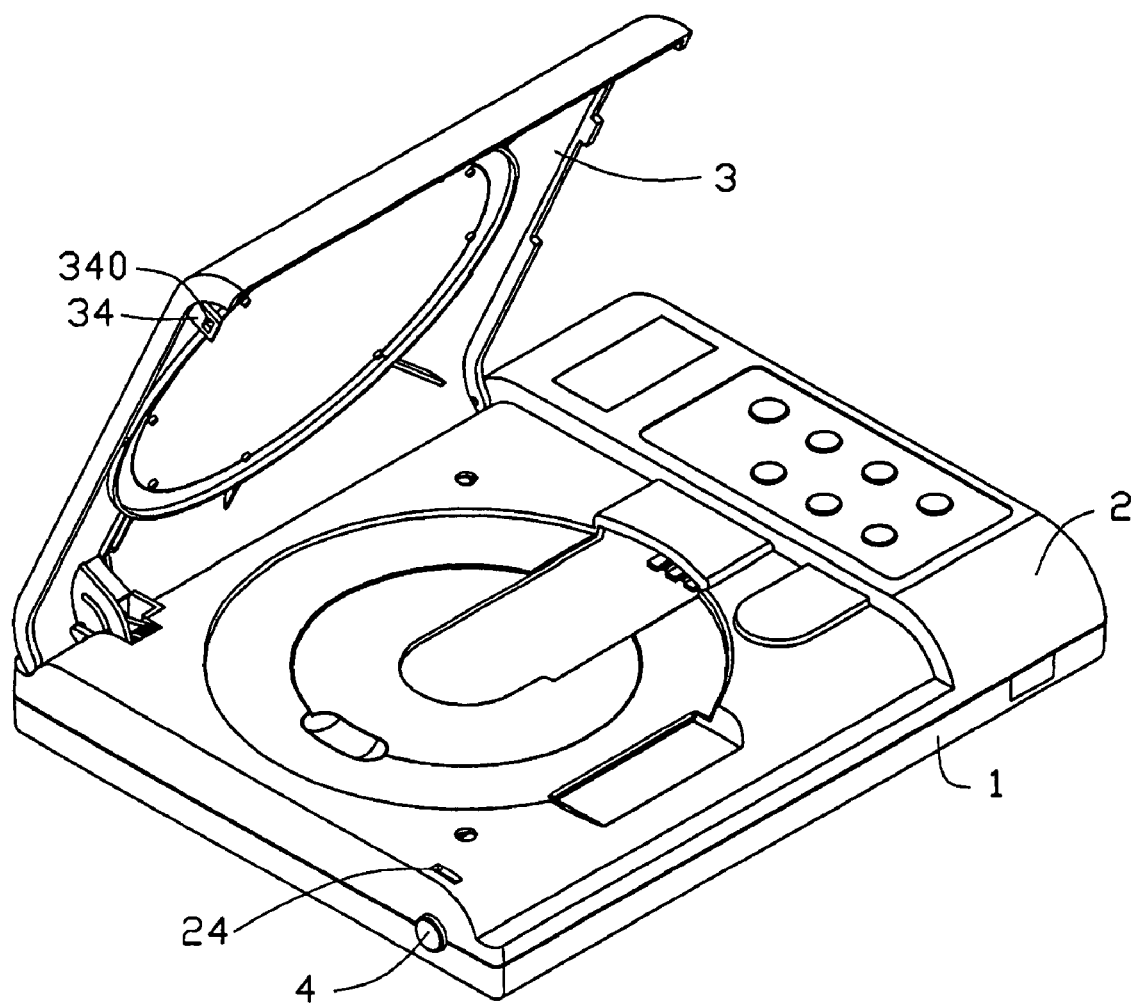
FIG. 1 is an isometric view of a portable DVD player with an opening actuator in accordance with the present invention, showing the portable DVD player in an open state.

Reference will now be made to the drawing figures to describe the preferred embodiment of the present invention in detail.

As shown in FIG. 1, a portable DVD player 100 in accordance with the present invention comprises a lower cover 1, an upper cover 2 for covering the lower cover 1, a top lid 3 hinged on the upper cover 2, and an opening actuator 4 for holding and releasing the top lid 3. A clasp arm 34 with a clasp hole 340 at a distal end thereof extends downwardly from a distal end corner of the top lid 3. A slot 24 is defined in a corner of the upper cover 2, for engagingly receiving the clasp arm 34 therein.

Figure 2:
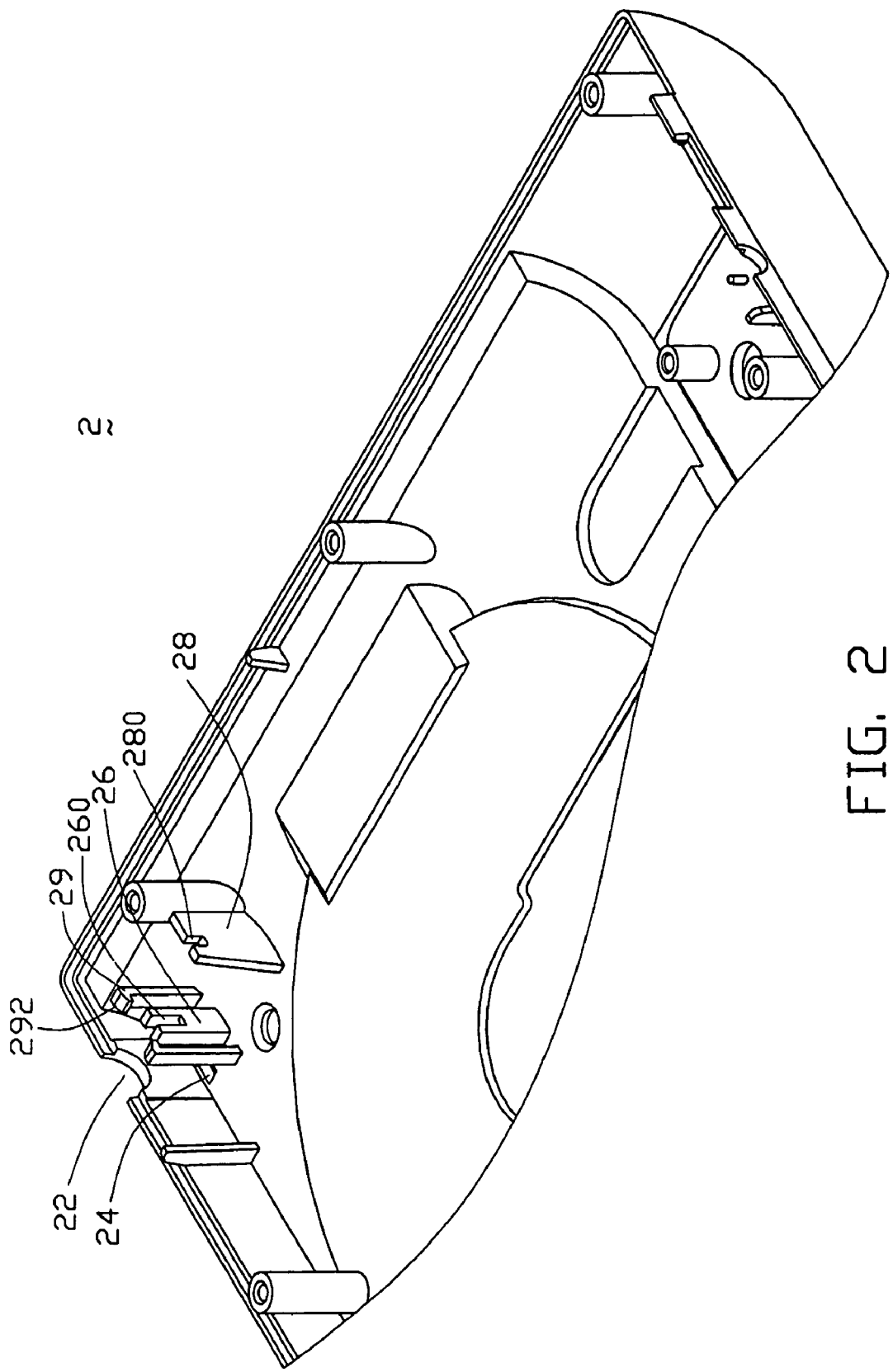
FIG. 2 is an enlarged, inverted view of part of an upper cover of the portable DVD player of FIG. 1.

Also referring to FIG. 2, a semicircular notch 22 is defined in a side wall of the upper cover 2. The notch 22, the slot 24, a first holder 26, and a second holder 28 are arranged in that sequence at an inside of the upper cover 2. The first and second holders 26, 28 extend downwardly from an inner surface of the upper cover 2. A first and a second guide grooves 260, 280 are respectively defined in distal ends of the first and second holders 26, 28. A pair of elastic hooks 29 each with a catch 292 at a distal end thereof extends downwardly from the inner surface of the upper cover 2 at opposite sides of the first holder 26 respectively.

Figure 3:
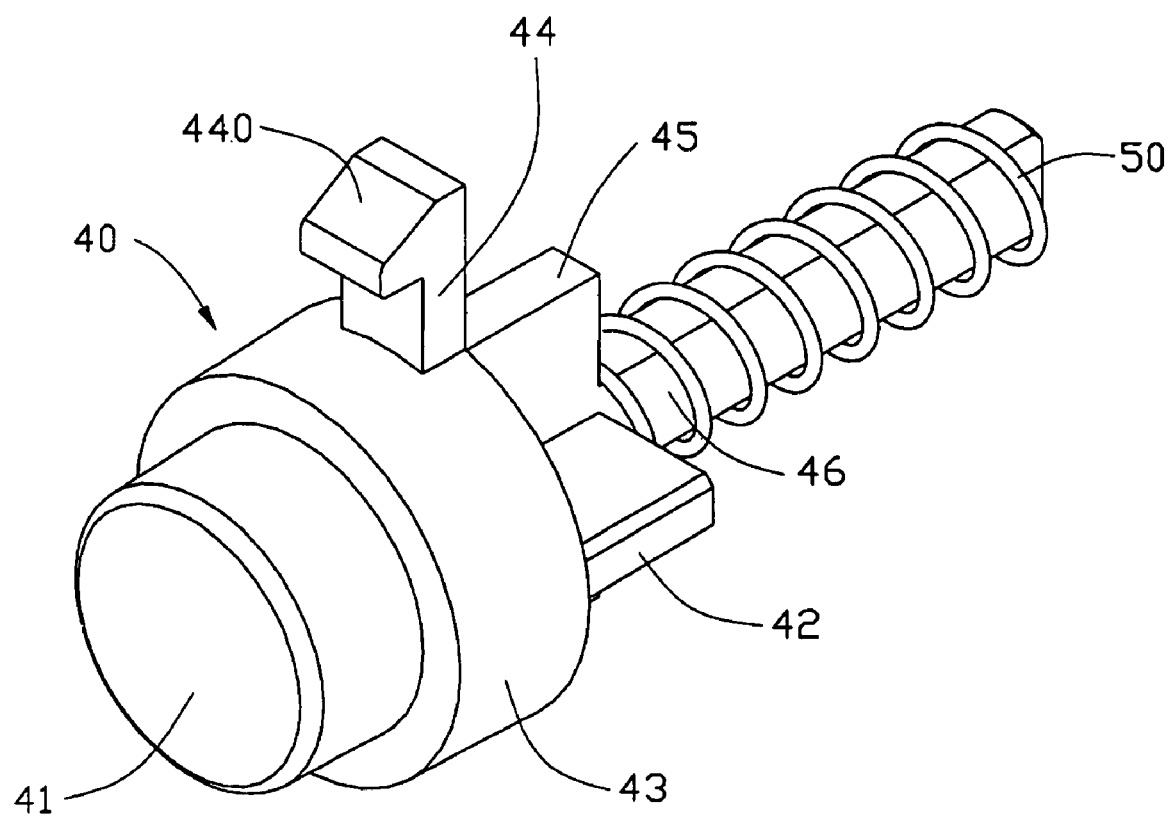
FIG. 3 is an enlarged, isometric view of the opening actuator of FIG. 1, the opening actuator comprising a press button and a compression spring.

Now referring to FIG. 3, the opening actuator 4 comprises a press button 40 and a compression spring 50. The press button 40 comprises a cylindrical press portion 41, a cylindrical stop portion 43, a clasp portion 44, an engaging portion 42, a short first guide portion 45, and a long second guide portion 46. The press portion 41 and the stop portion 43 are formed coaxially. The stop portion 43 is adapted to limit a stroke of the press button 40. A radius of the stop portion 43 is larger than that of the press portion 41. The clasp portion 44 extends radially from a periphery of the stop portion 43, and has a latch 440 at a distal end thereof. A bevel (not labeled) is defined at a distal end of the latch 440. The engaging portion 42 and the first guide portion 45 are perpendicular to each other. The second guide portion 46 has a rectangular cross-section. The compression spring 50 is placed around the second guide portion 46.

Figure 4:
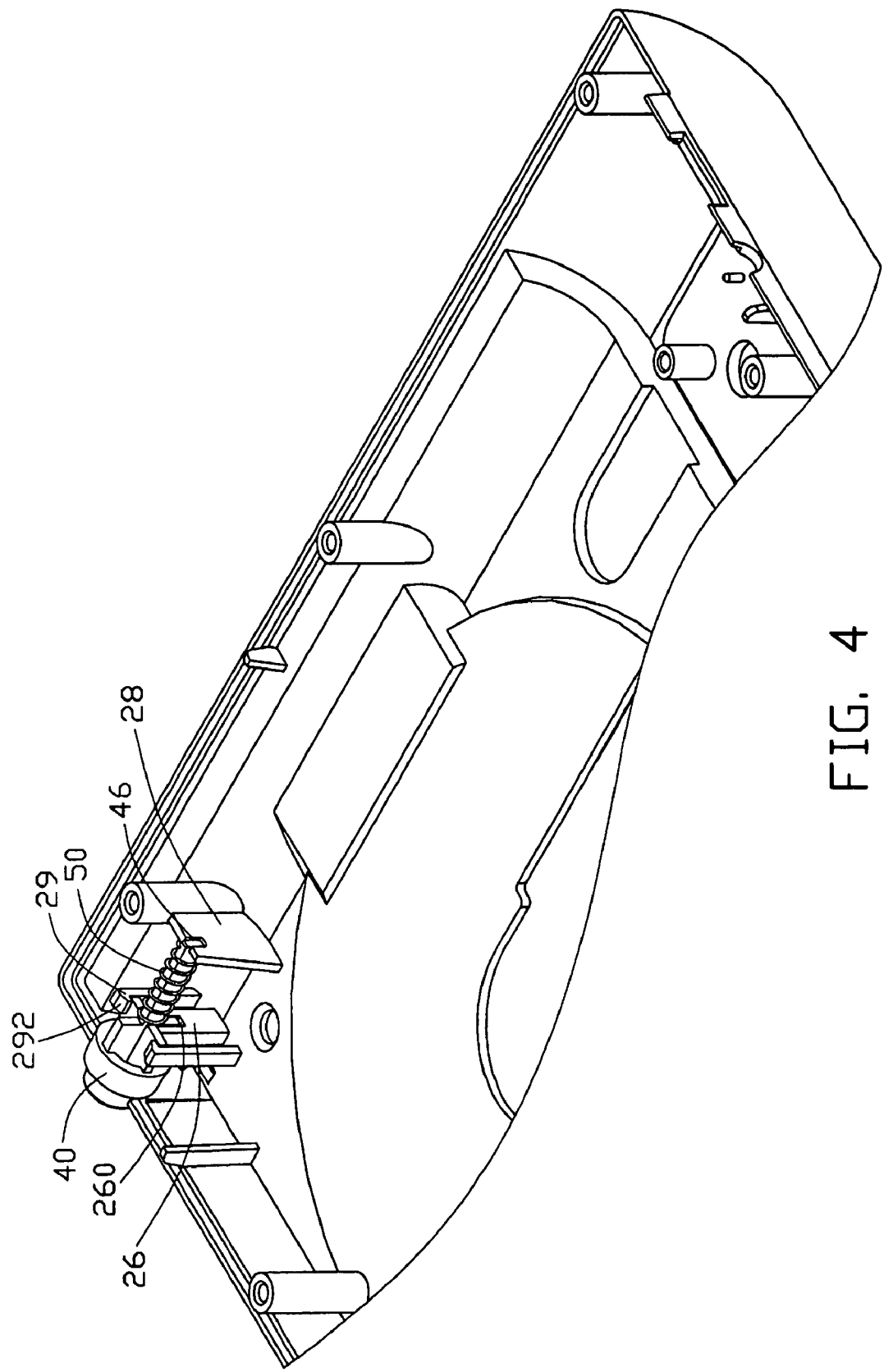
FIG. 4 is similar to FIG. 2, but showing the press button and the compression spring of FIG. 3 mounted in the upper cover.
Figure 5:
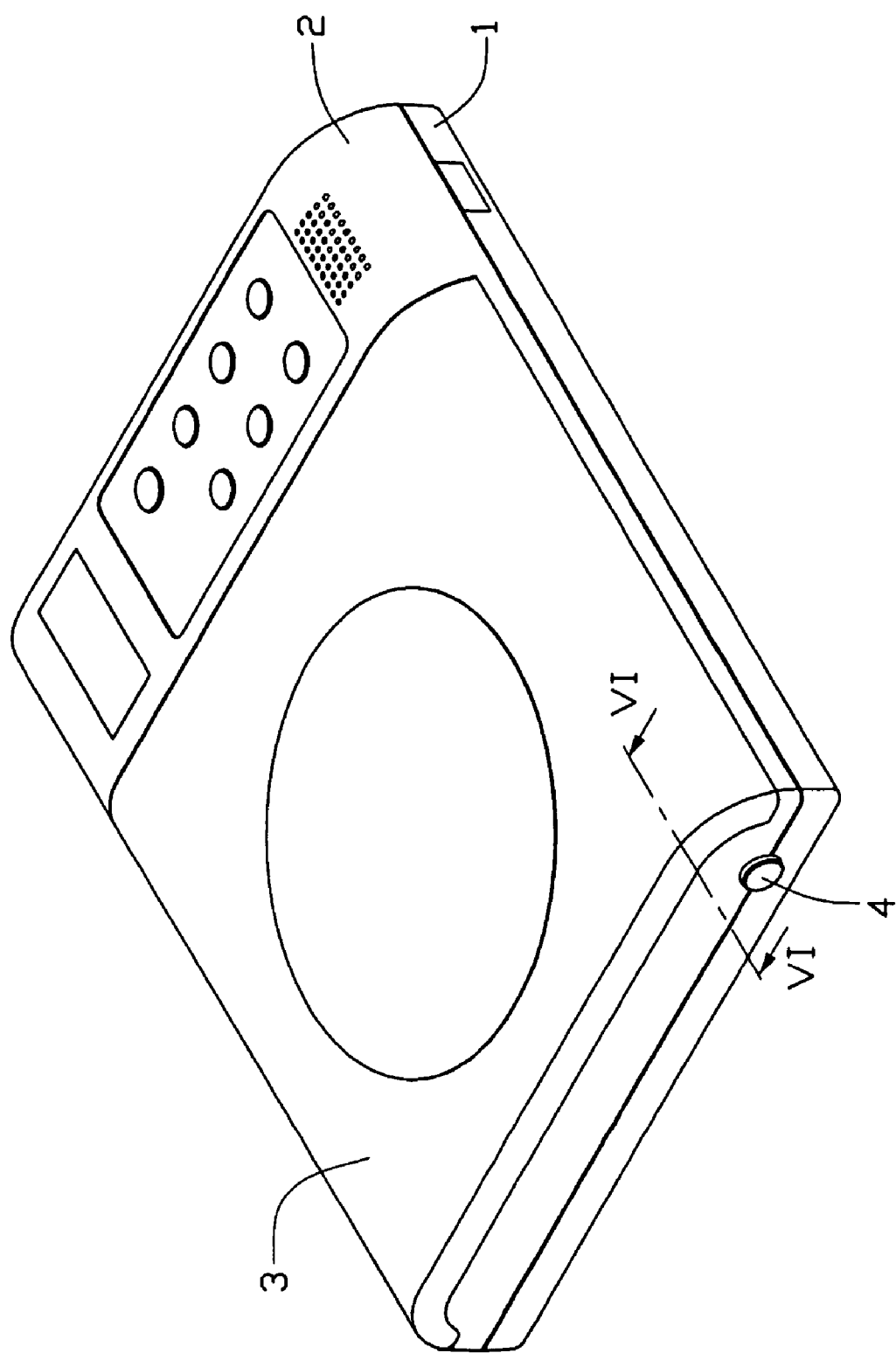
FIG. 5 is similar to FIG. 1, but showing the portable DVD player in a closed state.
Figure 6:
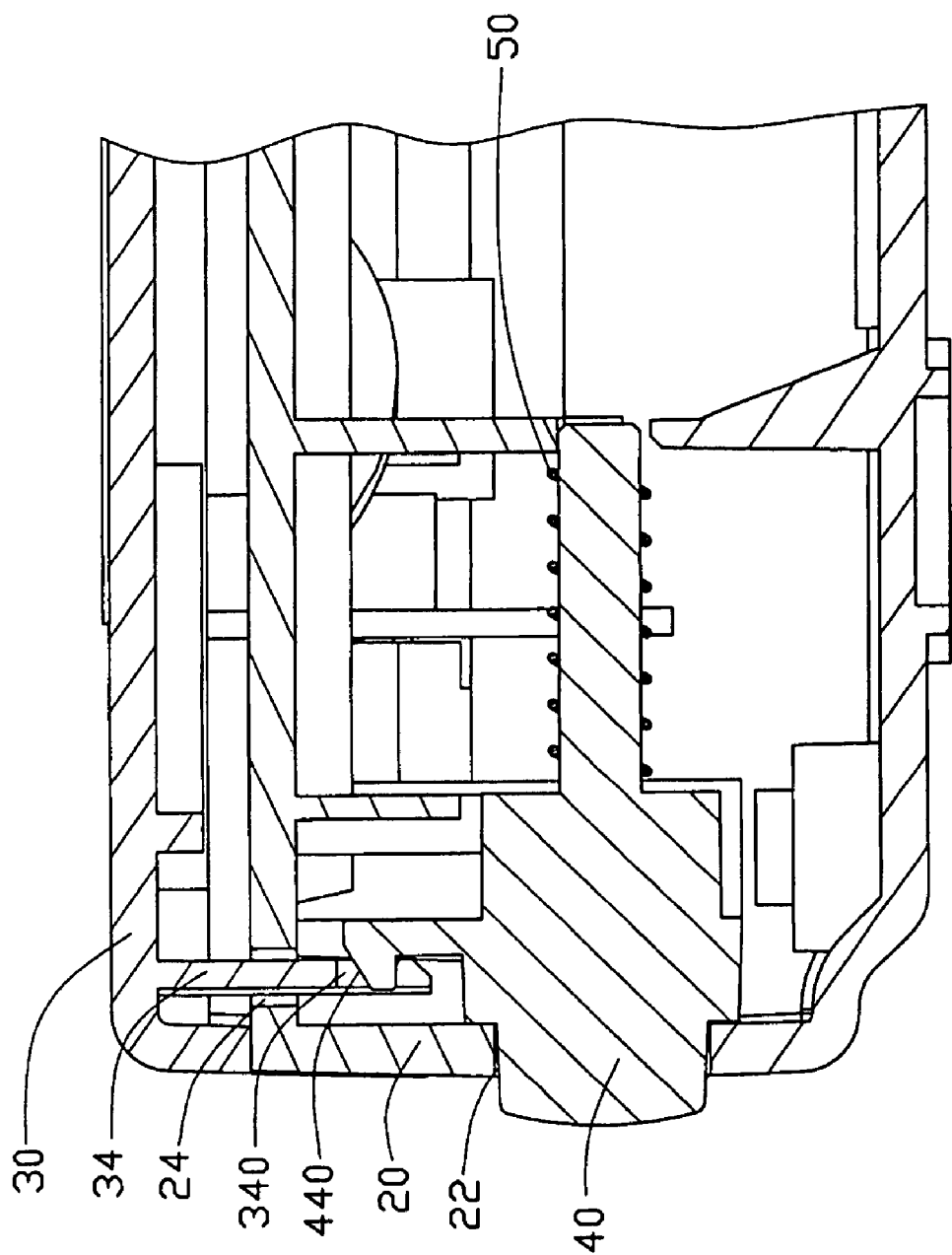
FIG. 6 is a cross-sectional view taken along line VI-VI of FIG. 5.
Figure 7:
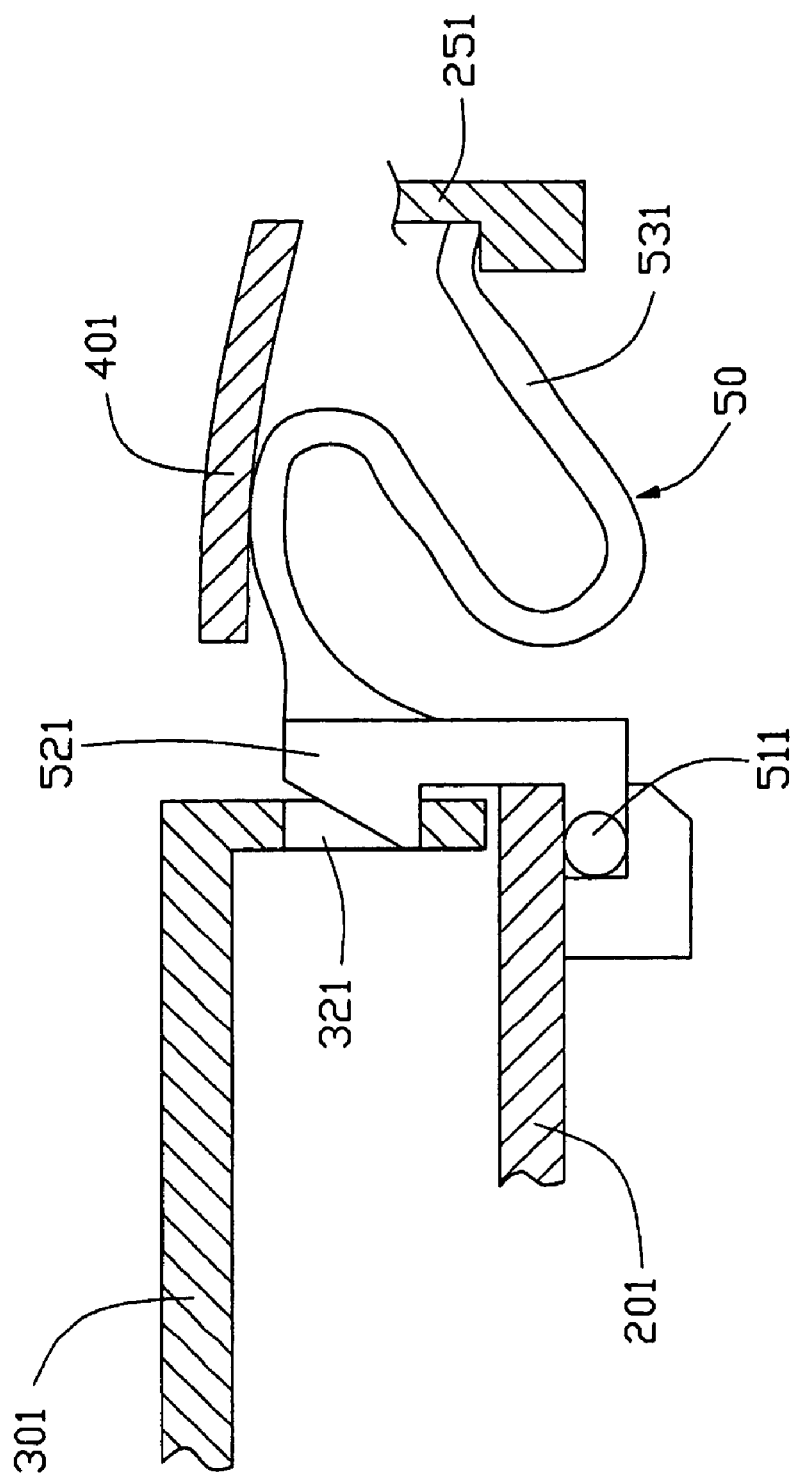
FIG. 7 is a cross-sectional view of part of an optical disc player having a conventional opening actuator.

As shown in FIG. 4, the press button 40 and the compression spring 50 are mounted in the upper cover 2. The press portion 41 of the press button 40 is partially received in the semicircular notch 22 of the upper cover 2. The stop portion 43 is movably located between the notch 22 and the first holder 26. The first and second guide portions 45, 46 are respectively partially received in the first and second guide grooves 260, 280. The engaging portion 42 is gripped by the pair of elastic hooks 29.

In assembly, the compression spring 50 is placed around the second guide portion 46 of the press button 40. Then, a distal end of the second guide portion 46 is received in the second guide groove 280. After that, a press force is applied to the press button 40, and the elastic hooks 29 are extruded away from each other. As a result, the press portion 41 and the first guide portion 45 are respectively moved into the first guide groove 260 and the semicircular notch 22.

In operation, when opening the top lid 3, a press force is applied to the press portion 41 of the press button 40. The press button 40 moves axially inwardly, and the compression spring 50 is compressed. At the same time, the clasp portion 44 of the press button 40 also moves inwardly, and the latch 440 is released from the clasp hole 340 of the clasp arm 34. Consequently, the top lid 3 can be freely opened. After that, the compression spring 50 decompresses and restores the press button 40 to its original position. When closing the top lid 3, a press force is applied to the top lid 3 so that it rotates downwardly. When the clasp arm 34 of the top lid 3 reaches the bevel of the latch 440, the clasp arm 34 rides along the latch 440. This makes the press button 40 move inwardly, with the compression spring 50 being compressed. Once the clasp hole 340 reaches the latch 440, the compression spring 50 decompresses and pushes the press button 40 back outwardly, and the latch 440 engages in the clasp hole 340. As a result, the clasp portion 44 is clasped by the clasp arm 34, and the top lid 3 is held in a closed position.

Because the press button 40 is located in a side of the combined upper and lower covers 2, 1 of the portable DVD player 100, there is little risk of the press button 40 being accidentally actuated.

In alternative embodiments, an elastic component such as an elastomer or rubber can be used as a substitute for the compression spring 50. Furthermore, the elastic hooks 29 and the first and second holders 26, 28 can be formed on the lower cover 1 instead of on the upper cover 2.

Although the present invention has been described with reference to specific embodiments, it should be noted that the described embodiments are not described embodiments without departing from the scope of the invention as defined by the appended claims.

What is claimed is:

1. An opening actuator for a video disc player, comprising:
   a clasp arm with a clasp hole at a distal end thereof, the clasp arm being adapted to be attached to a lid of the video disc player;
   a press button including a stop portion for limiting a stroke of the press button, a clasp portion, and at least one guide portion;
   an elastic component disposed around the press button for repositioning the press button by applying restoring force; and
   a cover comprising a positioning means for positioning the press button, and at least one guide means receiving the at least one guide portion of the press button;
   wherein the clasp portion of the press button engages in the clasp hole of the clasp arm for holding the top lid on the cover, and the press button can actuate the clasp portion thereof to exit the clasp hole for releasing the top lid from the cover.

2. The opening actuator for a video disc player as recited in claim 1, wherein a latch is formed at a distal end of the clasp portion.

3. The opening actuator for a video disc player as recited in claim 2, wherein a bevel is defined on the latch.

4. The opening actuator for a video disc player as recited in claim 3, wherein the positioning means and said guide portion are provided at an inner surface of the cover.

5. The opening actuator for a video disc player as recited in claim 4, wherein the press button further includes a press portion, a side wall of the cover defines a notch, and the notch movably receives the press portion of the press button.

6. The opening actuator for a video disc player as recited in claim 5, wherein the cover defines a slot for receiving the clasp arm therethrough.

7. The opening actuator for a video disc player as recited in claim 1, wherein the press button further includes an engaging portion engaged with the positioning means.

8. The opening actuator for a video disc player as recited in claim 7, wherein the positioning means comprises a pair of elastic hooks, each elastic hook has a catch at a distal end thereof, and the engaging portion of the press button is gripped by the elastic hooks.

9. A video disc player, comprising:
   a cover;
   a lid movable relative to the cover; and
   an opening actuator located at a side of the cover, the opening actuator being adapted to hold and release the lid, and including:
   a press button movably attached to the cover, and having a press portion and a clasp portion;
   an elastic component disposed around the press button for repositioning the press button by applying elastic force; and
   a clasp member attached to the lid, and being engagable with and releasable from the clasp portion of the press button.

10. The video disc player as recited in claim 9, wherein the cover defines a slot for receiving the clasp member therethrough.

11. The video disc player as recited in claim 9, wherein a latch is formed at a distal end of the clasp portion of the press button.

12. The video disc player as recited in claim 11, wherein a bevel is defined on the latch.

13. The video disc player as recited in claim 12, wherein the opening actuator further comprises a stop portion for limiting a stroke of the press button.

14. The video disc player as recited in claim 13, wherein a positioning means is provided on the cover to position the press button thereon.

15. The video disc player as recited in claim 14, wherein at least one guide means is provided on the cover, for guiding movement of the press button.

16. The video disc player as recited in claim 15, wherein the positioning means and said guide means are provided at an inner surface of the cover.

17. The video disc player as recited in claim 14, wherein the press button further comprises an engaging portion engaged with the positioning means.

18. The video disc player as recited in claim 17, wherein the positioning means comprises a pair of elastic hooks, each elastic hook has a catch at a distal end thereof, and the engaging portion of the press button is gripped by the elastic hooks.

19. A disc player, comprising:

a lid attached to said player in a close position thereof and movable relative to said player to expose a space between said lid and said player in an open position thereof;

an actuator installed to said player and having a portion reachable to said lid to engage with said lid and hold said lid in said close position thereof, said portion being movable along with said actuator in a predetermined direction so as to disengage said portion from said lid along said predetermined direction and allow said lid to move to said open position thereof.

20. The disc player as recited in claim 19, wherein said actuator comprises a press button accessible from outside of said player so as to be resiliently movable therefrom.

21. The disc player as recited in claim 20, wherein said portion to engage with said lid is integrally formed with said press button.

22. The disc player as recited in claim 19, wherein at least one holder is formed in said player to partially and guidably receive said actuator therein.

* * * * *